Figure 1:
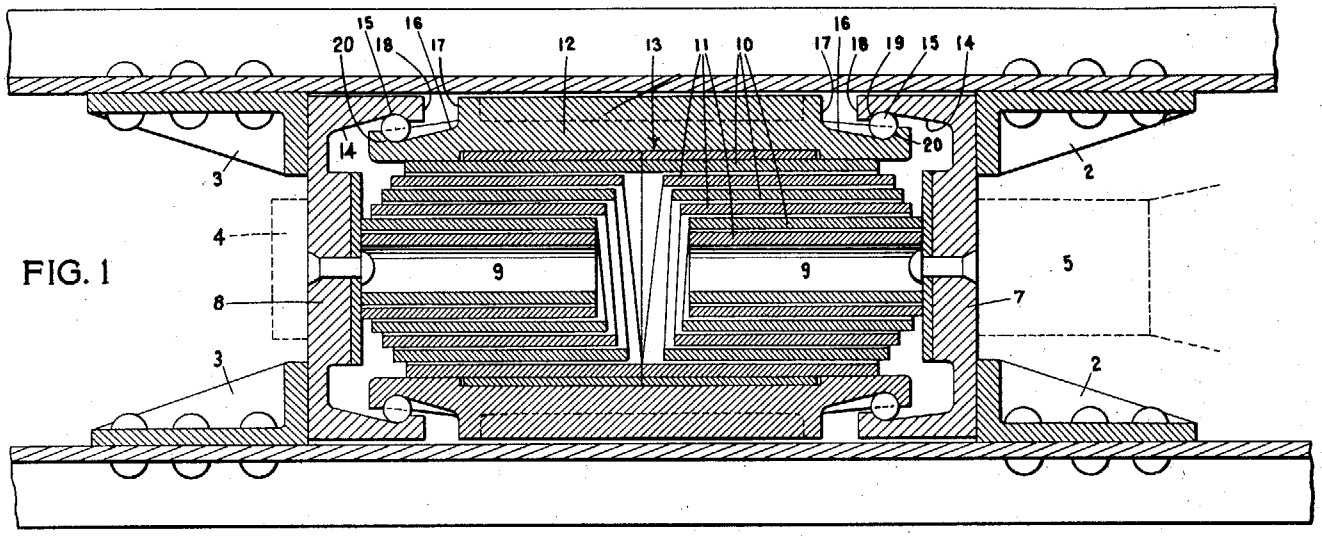

April 5, 1932. C. J. HOLLAND Re. 18,404

FRICTION DRAFT GEAR

Original Filed Jan. 13, 1926 2 Sheets-Sheet 1

Inventor

Cyrus J. Holland

By Ernest J. Mechlin

Attorney

April 5, 1932. C. J. HOLLAND Re. 18,404

FRICTION DRAFT GEAR

Original Filed Jan. 13, 1926 2 Sheets-Sheet 2

Inventor

Cyrus J. Holland

By Ernest J. Mecklin

Attorney

Reissued Apr. 5, 1932

Re. 18,404

UNITED STATES PATENT OFFICE

CYRUS J. HOLLAND, OF CHICAGO, ILLINOIS

FRICTION DRAFT GEAR

Original No. 1,653,098, dated December 20, 1927, Serial No. 81,058, filed January 13, 1926. Application for reissue filed July 26, 1928. Serial No. 295,589.

The invention relates to friction draft gear for railway cars.

The principal object of the invention, generally stated, is to provide a draft gear embodying a peculiar combination of longitudinally arranged springs and pressure applying means therefor responsive to relative movement of the followers under draft or buff so as to obtain spring action longitudinally and laterally together with friction within the springs themselves or between the convolutions thereof.

An important object of the invention is to provide a friction draft gear embodying a volute spring or springs arranged for longitudinal compression and having coacting therewith means for effecting lateral compression to produce friction between the convolutions of the springs during longitudinal movement thereof.

A more specific object of the invention is to provide a combination of volute springs and wedge means coacting therewith, the wedge means being responsive to relative movement of the followers toward each other and acting to apply pressure laterally upon the springs for not only compressing the springs in a lateral direction simultaneously with longitudinal compression by the followers but also to force the convolutions of the springs into engagement, thereby providing large friction areas.

Another object of the invention is the provision of a draft gear of this type in which, owing to the large contacting areas provided by the convolutions of the springs, the proper amount of friction will be obtained while the strains and wear will be uniformly distributed instead of being concentrated at limited areas as is the case with ordinary styles, the structure consequently possessing great durability and longevity.

A further object of the invention is to provide a draft gear embodying a volute spring or springs directly engaged by the front and rear followers and by laterally arranged compression shoes, the shoes having roller and wedge connections with the followers for producing the combined spring and friction effect desired.

A still further object of the invention is to provide a draft gear capable of being fitted within the standard spring pocket so that the structure may be considered and treated as a unit capable of replacing other forms of draft gears without making any changes in the construction of the draft rigging.

Figure 2:
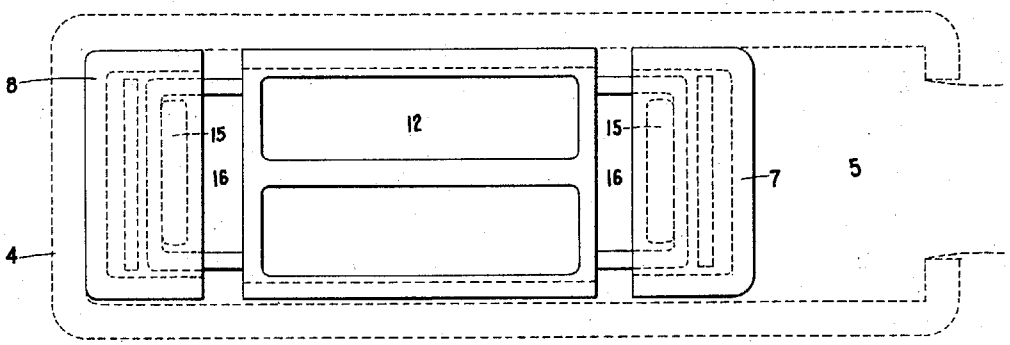
Figure 3:
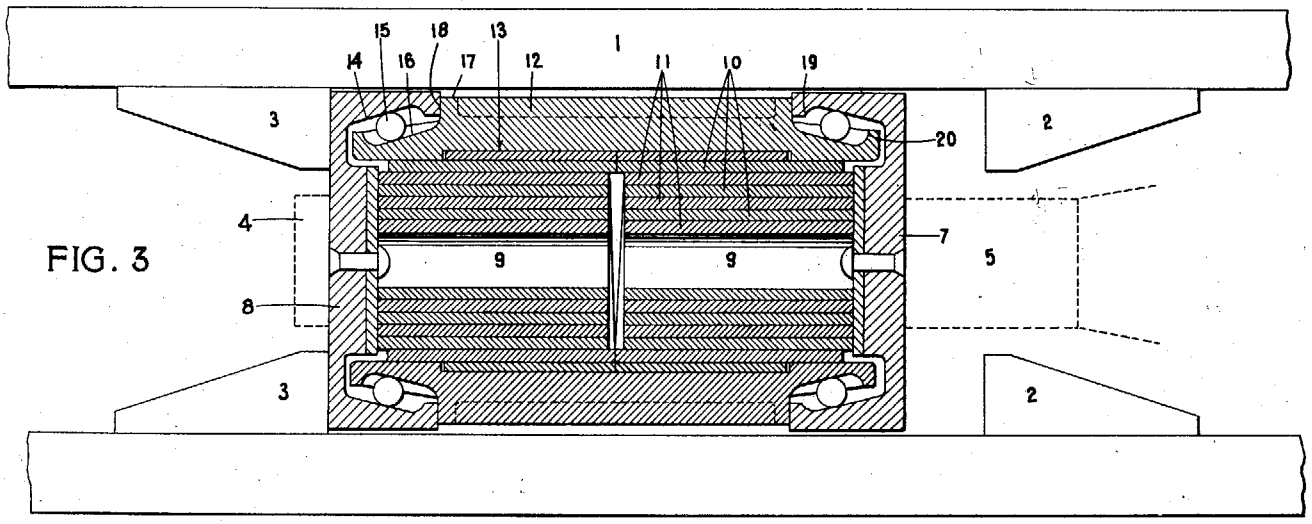
Figure 4:
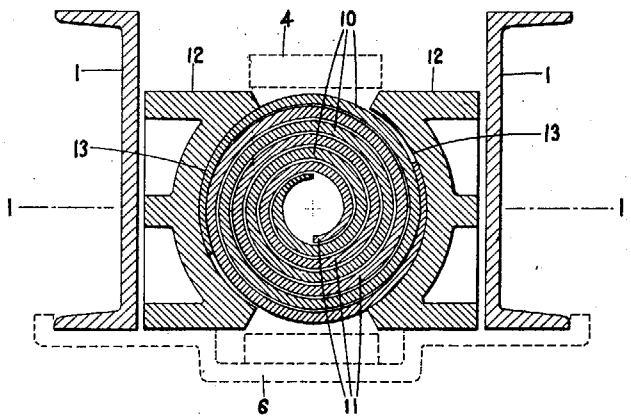

To the attainment of the foregoing and other objects and advantages, the invention preferably consists in the combination and arrangement of parts and the structural features to be hereinafter more fully described and claimed, and illustrated in the accompanying drawings in which:

Figure 1 is a horizontal section through the center sills of a railway car and through the draft gear in applied position, the view being taken on the line 1—1 of Figure 4, Figure 2 is a side elevation of the draft gear, the yoke and coupler butt being shown by dotted lines, Figure 3 is a view similar to Figure 1 showing the position of the parts under buff, and Figure 4 is a cross sectional view with the yoke and carry-iron shown by dotted lines.

Referring to the drawings in detail, the numeral 1 designates the center sills of a railway car and 2 and 3 designate, respectively, the front and back stops which are secured to the confronting sides of the center sills and which, together therewith, define the draft gear pocket. The yoke 4 and coupler butt 5 of the draft rigging are shown by dotted lines only as they form no part of the present invention. The usual carry-irons are indicated at 6 and are likewise shown by dotted lines. It is intended that the pocket be of the usual size conforming to well known standards.

In carrying out the present invention I provide front and rear followers 7 and 8 between which is engaged a spring structure which, in the present instance, is shown as including two sets of volute springs 9 though there should be no limitation as to the number employed or the exact character. Each set is disclosed as including two springs 10 and 11, one within the other, that is to say the convolutions of one being interposed between the successive convolutions of the other as clearly indicated in Figure 4 though both being preferably coiled in the same direction. Obviously a single volute spring could be used if desired without departing from the scope of the invention and other arrangements are also conceivable. These sets of springs are arranged in opposite relation with their protruding central portions engaging directly against the front and rear followers as indicated in Figure 1. Clearly these springs will act to provide cushioning means.

In conjunction with the springs I make use of shoes or bearing members 12 arranged at opposite sides of the springs and having their confronting faces preferably annularly recessed at 13 for receiving the thinned and narrowed outer ends of the springs. However, this last mentioned detail is not stressed as modifications might be resorted to. It is intended that these shoes move laterally toward each other when the followers move relatively toward each other and to accomplish this I have shown the followers as provided with inclined interior surfaces 14 engaged by rollers 15 in turn engaging upon inclined surfaces 16 at the end portions of the shoes or bearing members 12. In actual practice the inclined surfaces may be the bottoms of grooves of proper size to receive and permit movement of the rollers though this is likewise a mere structural detail of minor importance. The end portions of the shoes or bearing members are reduced in size so as to permit movement of the followers with respect to the shoes and it is preferable to provide coacting shoulders 17 and 18 on the shoes and followers, respectively, adapted to abut and consequently serve as stops when the gear is compressed to its maximum extent, thereby taking the thrust directly and preventing over-compression of the springs. By referring to Figure 3 it will be seen that these shoulders engage before the springs themselves are forced entirely together. At the ends of the inclined surfaces 14 and 16 are projections 19 and 20 which engage or are engaged by the rollers 15 when the gear is in its maximum expanded condition, the parts being thereby maintained in assembled relation and prevented from separation when the gear is out of the car.

In the operation, it will be clear that when buff or draft occurs, resulting in movement of one of the followers toward the other, or relative movement of the followers, the sets of springs are compressed longitudinally and will exert a cushioning effect. At the same time, the rollers 15 engaged between and coacting with the inclined surfaces 14 and 16 will cause the shoes or bearing members 12 to be forced inwardly or toward each other, resulting in the bringing of lateral pressure upon the sets of springs, this pressure not only compressing the springs to obtain further cushioning but forcing the convolutions of the springs into engagement so that as the longitudinal movement occurs friction is also produced. Clearly, the combination of the longitudinal and lateral cushioning effect together with the high degree of friction will operate to attain the desired result which is the elimination of undue shocks and jars to the entire draft rigging. When pressure on the followers is relieved the springs will of course return to normal expanded position, forcing the shoes or bearing members outwardly to their initial positions.

The invention is not limited to a friction draft gear as it is self-evident that a plurality of volute springs if of sufficient capacity may be employed without additional friction means or devices to form the cushioning unit. In view of the fact that each of the spring sets 9 includes the two springs 10 and 11 one within the other, it is apparent that I have provided volute springs operating in parallel which is equivalent to operating them in tandem so that the capacity can be greatly increased with no increase in the travel of the individual springs. It is consequently possible by this means to provide the spring resistance necessary in high capacity and heavy modern cars. When the expression "mounted in tandem" is used, the physical relation is referred to, that is to say: it is meant that the springs are arranged one before or behind the other. When it is said that the springs "operate in tandem", the functional relation or action is referred to, that is to say: it is meant that there is obtained the travel of one spring with the capacity of two, which is exactly what is accomplished by a parallel arrangement or operation.

While, as stated above, a single volute spring may be used in connection with followers and laterally moving shoes for producing lateral compression of the spring simultaneously with endwise pressure thereon, or in other words during closure, it is obvious that when the invention is embodied in a spring gear, in contradistinction to a friction gear, a plurality of springs must be used to obtain the tandem or parallel operation above set forth.

Another feature of advantage in the construction disclosed is that the actuating means for the springs is located entirely exteriorly thereof, making it possible to have inner convolutions, the most important, of much smaller diameter than would be feasible if a tail bolt or plunger, extending through the springs, were provided. This feature makes it possible to obtain the maximum capacity from a given size of steel because the inner coil may be made to the smallest diameter consistent with fibre stress and methods of manufacture.

While I have shown and described the preferred embodiment of the invention, it should be understood that the entire disclosure is merely illustrative as the right is reserved to make any changes and modifications as may widen the field of utility and increase the adaptability of the device or structure, provided such variations constitute no departure from the spirit of the invention or the scope of the claims hereunto appended.

Having thus described the invention, I claim:

1. In a railway car draft gear, followers, a longitudinally arranged spring located between the followers and compressible thereby means located against the outer sides of the spring at opposite points, and coacting means on the first named means and the followers for moving said first named means to apply lateral pressure upon the spring when longitudinal pressure is brought to bear.

2. In a railway car draft gear, front and rear followers, a volute spring interposed therebetween in engagement therewith, and means arranged laterally of the spring and bearing inwardly against the outside thereof at opposite points and coacting with the followers to compress the spring laterally upon longitudinal compression thereof.

3. In a railway draft gear, front and rear followers, a volute spring arranged longitudinally between the followers, laterally movable means located against the outside of the spring at opposite points, and means engaging said means and the followers for moving said means into compressing engagement with the spring upon longitudinal compression thereof to produce friction between the convolutions.

4. In a railway draft gear, front and rear followers, a volute spring longitudinally arranged and interposed therebetween, bearing means located laterally of the spring and bearing against the outside thereof at opposite points, and means connected with the followers for moving said bearing means to compress the spring laterally and produce friction upon longitudinal compression thereof.

5. In a railway draft gear, front and rear followers, volute spring means interposed between the followers and arranged longitudinally, and means located against the outer side of the spring at opposite points and operatively engaged by the followers for compressing the spring laterally simultaneously with longitudinal compression thereof.

6. In a railway draft gear, front and rear followers, volute spring means longitudinally arranged between and engaging the followers, pressure applying means located laterally of the spring means and engaging against the outer side thereof at opposite points, and wedge connections between the followers and the pressure applying means for moving the latter laterally to compress the spring means and produce friction between the convolutions thereof upon longitudinal compression.

7. In a railway draft gear, front and rear followers, volute springs arranged between the followers and engaged thereby, bearing members located laterally of the springs and engaging against the outer sides thereof at opposite points, said bearing members having wedge connections with the followers for compressing the springs laterally upon longitudinal compression thereof.

8. In a railway draft gear, front and rear followers, sets of volute springs arranged therebetween in engagement therewith, bearing members arranged at opposite sides of the springs, and coacting wedging surfaces on the followers and bearing members for moving the latter toward each other to compress the springs laterally and produce friction between the convolutions thereof upon longitudinal compression.

9. In a railway draft gear, front and rear followers, sets of volute springs arranged therebetween in engagement therewith, bearing members arranged at opposite sides of the springs, and coacting wedging surfaces on the followers and bearing members for moving the latter toward each other to compress the springs laterally and produce friction between the convolutions thereof upon longitudinal compression, each set of springs including a pair arranged with their successive convolutions interfitting.

10. In a railway draft gear, front and rear followers, sets of volute springs arranged therebetween in engagement therewith, bearing members arranged at opposite sides of the springs, and coacting wedging surfaces on the followers and bearing members for moving the latter toward each other to compress the springs laterally and produce friction between the convolutions thereof upon longitudinal compression, each set of springs including a pair arranged with their successive convolutions interfitting, the springs of each pair being coiled in the same direction.

11. A railway draft gear comprising in combination, front and rear followers having inclined surfaces, sets of volute springs arranged in coaxial relation between the followers, and bearing shoes located at opposite sides of the sets of springs in engagement therewith and having inclined surfaces coacting with the first named inclined surfaces whereby to be moved laterally for compressing the sets of springs upon movement of the followers toward each other.

12. A railway draft gear comprising in combination, front and rear followers having inclined surfaces, sets of volute springs arranged in coaxial relation between the followers, bearing shoes located at opposite sides of the sets of springs in engagement therewith and having inclined surfaces coacting with the first named inclined surfaces whereby to be moved laterally for compressing the sets of springs upon movement of the followers toward each other, said shoes being recessed to receive the ends of the outer convolutions of the springs.

13. In a shock absorbing device, spaced followers, oppositely arranged volute springs mounted in tandem interposed between the followers, and means for compressing the spring means longitudinally and laterally at the same time.

14. In a shock absorbing device, spaced followers, a pair of oppositely wound volute springs mounted in end to end relation interposed between the followers, and means for compressing the spring means longitudinally and laterally during closure.

15. In a draft gear, in combination, a volute spring having the generatrix of its convolutions parallel with the longitudinal axis, and means to simultaneously compress said spring in two directions at right angles to each other.

16. In a draft gear, in combination, a volute spring, and exterior means for applying longitudinal and lateral compressive force thereto simultaneously, the convolutions of the spring having surfaces generated by a line remaining parallel with its surface of generation and moving in a spiral path about the longitudinal axis of the gear.

17. In a draft gear, a plurality of volute springs mounted in directly contacting end to end relation, means engaging the outer ends thereof for energizing the same and moving the convolutions in a direction parallel with the axis of the gear, and means operable by said first named means for compressing the springs in a direction at right angles to the axis thereof.

18. In a draft gear, in combination, a volute spring having the generatrix of its convolutions substantially parallel with the longitudinal axis, and means to compress said spring in two directions at right angles to each other during closure.

19. In a draft gear, a plurality of volute springs mounted in end to end relation, means engaging the outer ends thereof for energizing the same and moving the convolutions in a direction parallel with the axis of the gear, and means operable by said first named means for compressing the springs in a direction at right angles to the axis thereof.

20. In a draft gear, in combination, a volute spring, and exterior means for applying longitudinal and lateral compressive force thereto, the convolutions of the springs having surfaces generated by a line remaining parallel with its surface of generation and moving in a spiral path about the longitudinal axis of the gear.

21. In a draft gear, in combination, a volute spring having the generatrix of its convolutions substantially parallel with the longitudinal axis, and means for compressing said spring bodily in two directions at right angles to each other during closure.

22. In a draft gear, in combination, a volute spring having the generatrix of its convolutions substantially parallel with the longitudinal axis, and means for compressing and reducing the diameter and length of the spring during closure.

23. In a draft gear, in combination, a volute spring having the generatrix of its convolutions substantially parallel with the longitudinal axis, and means located exteriorly with respect to said spring and movable to compress it in two directions at right angles to each other during closure.

24. In a draft gear, in combination, a volute spring having the generatrix of its convolutions substantially parallel with the longitudinal axis, and means located exteriorly of the spring for applying inward compressive force thereto in two directions at right angles to each other during closure.

In testimony whereof I affix my signature.

CYRUS J. HOLLAND.